United States Patent
Dudel et al.

(10) Patent No.: US 7,236,877 B2
(45) Date of Patent: Jun. 26, 2007

(54) CHIPPED ENGINE CONTROL UNIT SYSTEM HAVING COPY PROTECTED AND SELECTABLE MULTIPLE CONTROL PROGRAMS

(75) Inventors: Frank Dudel, Huntsville, AL (US); Mitchell W. Simmons, Denton, TX (US); Todd G. Williams, Destin, FL (US)

(73) Assignee: RTK Technologies Limited, West Midlands (GB)

( * ) Notice: Subject to any disclaimer, the term of this patent is extended or adjusted under 35 U.S.C. 154(b) by 483 days.

(21) Appl. No.: 10/973,459

(22) Filed: Oct. 27, 2004

(65) Prior Publication Data

US 2005/0086539 A1 Apr. 21, 2005

(51) Int. Cl.
F02D 43/04 (2006.01)
G06F 7/70 (2006.01)

(52) U.S. Cl. .................. 701/115; 700/90; 701/114; 711/100

(58) Field of Classification Search ........... 701/114, 701/115; 700/90; 711/100, 103, 163
See application file for complete search history.

(56) References Cited

U.S. PATENT DOCUMENTS

| | | | |
|---|---|---|---|
| 4,751,633 A | 6/1988 | Henn et al. ............... 714/18 |
| 5,014,234 A | 5/1991 | Edwards, Jr. ............ 713/200 |
| 5,016,180 A | 5/1991 | Fujisawa ................. 701/102 |
| 5,056,026 A | 10/1991 | Mitchell et al. .......... 701/101 |
| 5,091,858 A | 2/1992 | Paielli .................... 701/115 |
| 5,200,900 A | 4/1993 | Adrain et al. ............ 701/115 |
| 5,247,446 A | 9/1993 | Motz et al. .............. 701/115 |
| 5,293,317 A | 3/1994 | Adrain et al. ............ 701/115 |
| 5,446,665 A | 8/1995 | Adrian et al. ............ 701/102 |
| 5,467,277 A | 11/1995 | Fujisawa et al. .......... 701/51 |
| 5,608,632 A | 3/1997 | White .................... 701/103 |
| 5,619,412 A | 4/1997 | Hapka .................... 701/36 |
| 5,769,051 A | 6/1998 | Bayron et al. ............ 123/335 |
| 5,771,347 A | 6/1998 | Grantz et al. ............ 713/200 |
| 5,802,485 A | 9/1998 | Koelle et al. ............ 701/29 |
| 5,803,043 A | 9/1998 | Bayron et al. ............ 123/335 |
| 5,806,015 A | 9/1998 | Kimoto ................... 701/115 |
| 5,901,682 A | 5/1999 | McGee et al. ........... 123/339.19 |
| 6,005,863 A | 12/1999 | Deng et al. ............. 370/392 |
| 6,205,395 B1 | 3/2001 | Young et al. ............ 701/115 |
| 6,272,424 B1 | 8/2001 | Yoshida et al. .......... 701/103 |
| 6,285,948 B1 | 9/2001 | Takagi et al. ........... 701/115 |
| 6,339,743 B1 | 1/2002 | Young et al. ............ 701/115 |
| 6,415,769 B1 | 7/2002 | Fisher, Jr. et al. ....... 123/486 |

(Continued)

FOREIGN PATENT DOCUMENTS

WO WO 02/14981 2/2002

*Primary Examiner*—Willis R. Wolfe
*Assistant Examiner*—Johnny H. Hoang
(74) *Attorney, Agent, or Firm*—Shlesinger, Arkwright & Garvey LLP

(57) ABSTRACT

The present invention discloses a method for preventing a control program written in a first engine control unit (ECU) from running in a second ECU, comprising obtaining an ID number from the first ECU; encrypting the ID number; writing the encrypted ID number into a flash memory of the first ECU; encrypting the ID number again and writing the encrypted ID number into an EEPROM of the first ECU; and requiring the control program to match the encrypted ID number placed in the flash memory and the EEPROM before running the program, and if the match fails, terminating the control program from running further.

27 Claims, 10 Drawing Sheets

U.S. PATENT DOCUMENTS

| | | | |
|---|---|---|---|
| 6,424,157 B1 | 7/2002 | Gollomp et al. | 324/430 |
| 6,505,280 B2 | 1/2003 | Terada et al. | |
| 6,535,811 B1 | 3/2003 | Rowland et al. | 701/115 |
| 6,604,027 B1 | 8/2003 | Kawakami et al. | 701/1 |
| 6,633,807 B2 | 11/2003 | Augsburger et al. | 701/115 |
| 6,684,851 B1 | 2/2004 | Galtier et al. | 123/406.44 |
| 6,823,842 B2 * | 11/2004 | Meek et al. | 123/406.29 |
| 2004/0002793 A1 | 1/2004 | Tachibana et al. | 701/1 |
| 2004/0021550 A1 | 2/2004 | Ohtaki et al. | 340/5.31 |

* cited by examiner

Original Code

- Stock OR Chipped 3D Ignition Advance Lookup
- ↓
- Final Baseline ignition advance Modified Code

- Stock 3D Ignition Advance Lookup → Multiply by: (1 - TCV)
- Chipped 3D Ignition Advance Lookup → Multiply by: TCV
- → Add Both Results
- → Final Baseline ignition advance TCV = "Timing Control Variable"
Scaling is from 0.0 (stock mode) to 1.0 (chipped mode)

FIG.4A  FIG.4B

CHIPPED ENGINE CONTROL UNIT SYSTEM HAVING COPY PROTECTED AND SELECTABLE MULTIPLE CONTROL PROGRAMS

FIELD OF THE INVENTION

The present invention relates generally to an automobile engine onboard computer, commonly known as an engine control unit (ECU) and particularly to a reprogrammed (chipped) ECU with copy protection and a range of performance levels selectable by the user.

BACKGROUND OF THE INVENTION

In the automotive aftermarket, a vehicle owner can have the engine management software in the engine control unit (ECU) reprogrammed for increased engine torque and power output and for other desired operating characteristics. If the modified software is not protected from copying, one can easily read out the code from the ECU, copy it into another ECU and successfully run the program. There is, therefore, a need to protect the reprogrammed software from being copied without permission.

A conventional reprogrammed (chipped) ECU allows the user of either running the factory stock engine control program or choosing to run the chipped performance program. However, the user cannot run the chipped performance program at less than 100%, for reasons, for example, that he is worried about an adverse impact the chipped program might have on the engine. He is required to run either at stock mode or full chipped mode. A combination between the two modes is not available. There is, therefore, a need for a chipped performance program that can be adjusted to run less than 100% of the chipped performance levels, or at any point between two performance modes.

SUMMARY OF THE INVENTION

The present invention provides a method for preventing a control program written in a first engine control unit (ECU) from running in a second ECU, comprising obtaining an ID number from the first ECU; encrypting the ID number; writing the encrypted ID number into a flash memory of the first ECU; encrypting the ID number again and writing the encrypted ID number into an EEPROM of the first ECU; and requiring the control program to match the encrypted ID number placed in the flash memory and the EEPROM before running the program, and if the match fails, terminating the control program from running further.

The present invention also provides a method for providing a user a range of performance levels based on first and second performance lookup tables written into an engine control unit (ECU), comprising providing first and second performance lookup tables in the ECU; assigning first and second constants corresponding to the first and second performance lookup tables, respectively; providing a range of variables disposed numerically between the first and second constants for selection by the user; and generating a third performance lookup table corresponding to the variable chosen by the user by linear interpolation between the first and second performance lookup tables.

The present invention further provides a chipped engine control unit (ECU) system, comprising a chipped ECU; and an external device communicating with the chipped ECU through a communications port of the ECU. The chipped ECU includes a stock performance lookup table and a chipped performance lookup table. The external device allows a user to choose another performance lookup table generated by linear interpolation between the first and second performance lookup tables such that the user can select to operate the ECU at the stock performance lookup table or the chipped performance lookup table, or in between the stock and chipped performance lookup tables.

The present invention further provides a chipped engine control unit (ECU) system, comprising a chipped ECU, including a stock performance lookup table and a chipped performance lookup table. The chipped ECU is programmed to run the performance lookup table only if an ID number of the ECU matches with data located in predetermined locations in the ECU flash memory and EEPROM.

The present invention provides a chipped engine control unit (ECU) system, comprising a chipped ECU, including a stock performance lookup table and a chipped performance lookup table. The chipped ECU includes a timer set for a predetermined period of time to allow the user to evaluate the chipped ECU.

BRIEF DESCRIPTIONS OF THE DRAWINGS

FIG. 4A is a flowchart of selecting a stock or chipped 3-dimensional ignition advance lookup table.

FIG. 4B is a flowchart of combining two 3-dimensional ignition advance lookup tables to another lookup table.

DETAILED DESCRIPTION OF THE INVENTION

Figure 1:
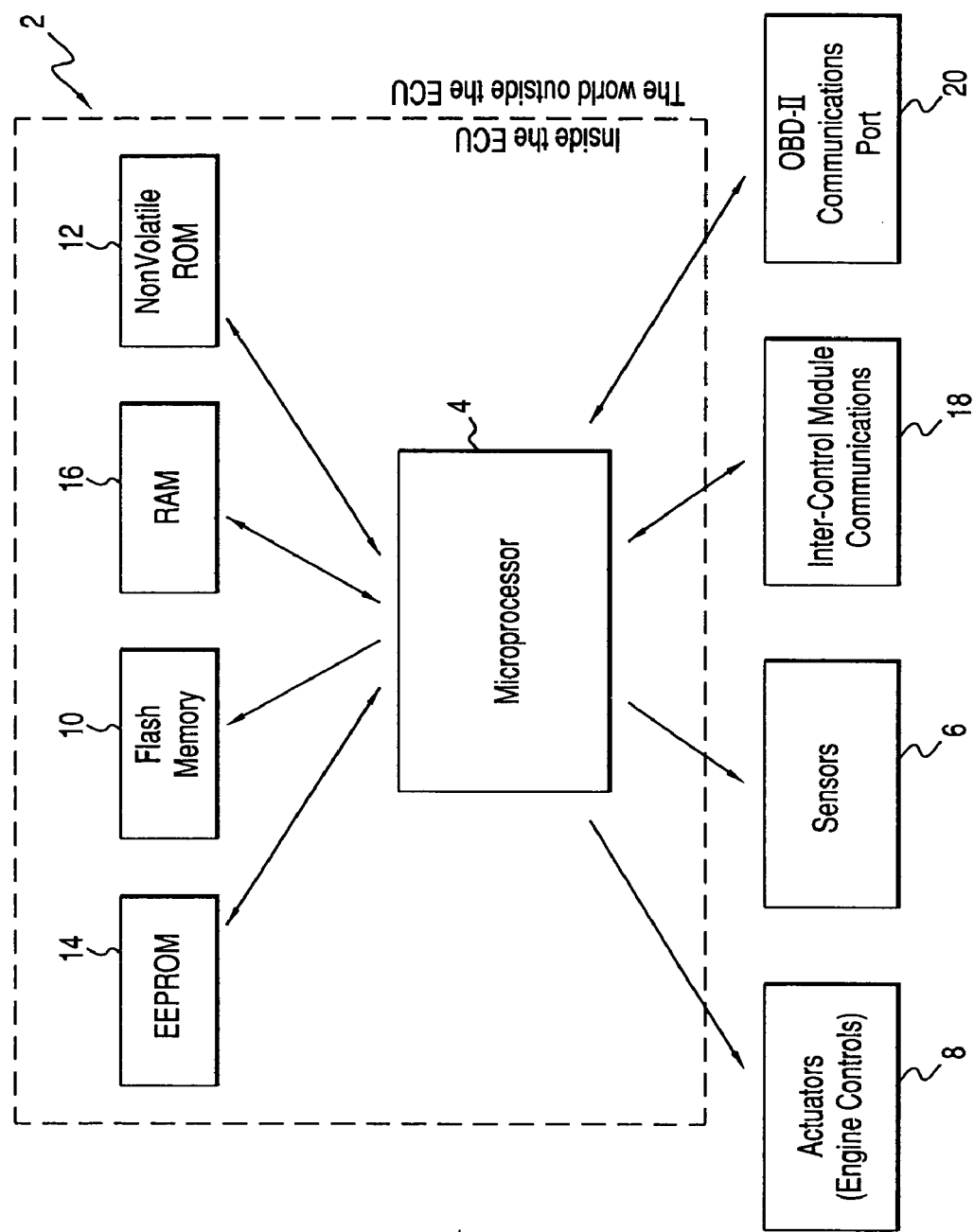
FIG. 1 is a schematic functional block diagram of an engine control unit.

A modern automobile engine is controlled by an onboard computer, commonly known as an engine control unit (ECU). A functional block diagram of an ECU 2 is disclosed in FIG. 1. The ECU comprises a microprocessor 4 which is used to execute the engine control program. The ECU 2 contains circuitry to process both analog and digital on/off type inputs from sensors 6 that are then used by the microprocessor 4 to determine the current engine operation.

The sensors 6 provide data on engine speed, temperatures, pressures, intake air temperature, engine coolant temperature, fuel temperature, fuel pressure, barometric pressure, boost pressure, mass air flow, accelerator pedal angle, engine speed, knock sensor, cam phasing, battery voltage, oxygen sensor, exhaust gas temperature, etc. The engine control program is used to process these measured operating conditions to derive the appropriate control output signals to run various engine control actuators 8, such as fuel injectors, ignition timing (gasoline), turbo-charger control, emissions control systems, variable cam shaft control, etc. Additional parameters affecting the desired engine operating conditions can be received from other control modules, such as torque reduction request from the automatic transmission control module during a gear shift.

The main control program, control algorithms, lookup tables, constants and other important aspects of the engine control program are stored in a flash memory 10 so that the ECU operating characteristics can be upgraded in the field. Some often used routines such as table lookups can be stored in a non-volatile ROM 12, if available, since these routines will be generally required by every conceivable control program. Flash memory reprogramming routines may also be stored in the non-volatile ROM 12, allowing the microprocessor 4 to execute a flash reprogramming program while the flash memory is unavailable for program execution. An EEPROM 14 is used to store serial numbers, unique ID codes and adaptation values. A RAM 16 is used to store temporary results. An inter-control module 18 transfers data to and from the immobilizer, automatic transmission control module (torque reduction requests), ABS system, traction control system, etc. An OBD-II communications port 20 provides a connection means for the ECU to the outside world for diagnostic tests, error codes and ECU reprogramming.

Chipping is the replacement of the factory installed control program with a new control program that gives the user the perception he has a more powerful car, although there are usually real and measurable power gains. Thus, a chipped ECU is one whose original control program has been replaced or modified by a new control program. Generally, chipping is accomplished by physically unsoldering the ECU's flash memory chip, reprogramming it externally, and resoldering it into the ECU. This is done when the reprogramming protocols that allow the flash memory to be reprogrammed inside the ECU are not known.

Production ECUs as placed in a car by the factory generally have identical engine control programs stored in the flash memory and identical code in the non-volatile ROM (if present). This is also true even for chipped vehicles. The only difference between a stock (factory programed ECU) and a chipped ECU is the replacement of the control program stored in the flash memory. Even then, every chipped ECU for a specific car model will tend to have the same control program burnt into the flash memory. Flash memory only allows large sectors to be erased at a time for a much limited number of times.

The EEPROM 14 provides a non-volatile storage for some small amount of data that is specific to its individual ECU. This includes government mandated oxygen sensors statistics, error codes, adaptation values, vehicle VIN numbers or miscellaneous ID and serial numbers. The EEPROM allows individual bytes to be selectively erased and rewritten many times.

Figure 2A:
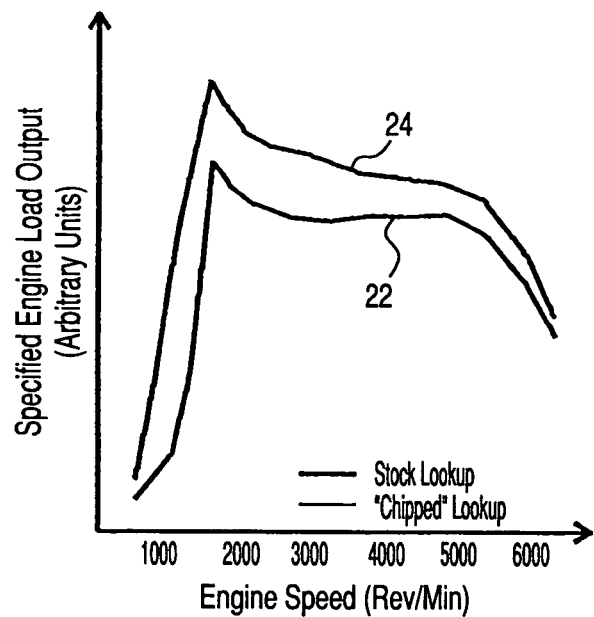
FIG. 2A is an example of a 2-dimensional specified engine load lookup tables for a stock and chipped engine control programs.
Figure 2B:
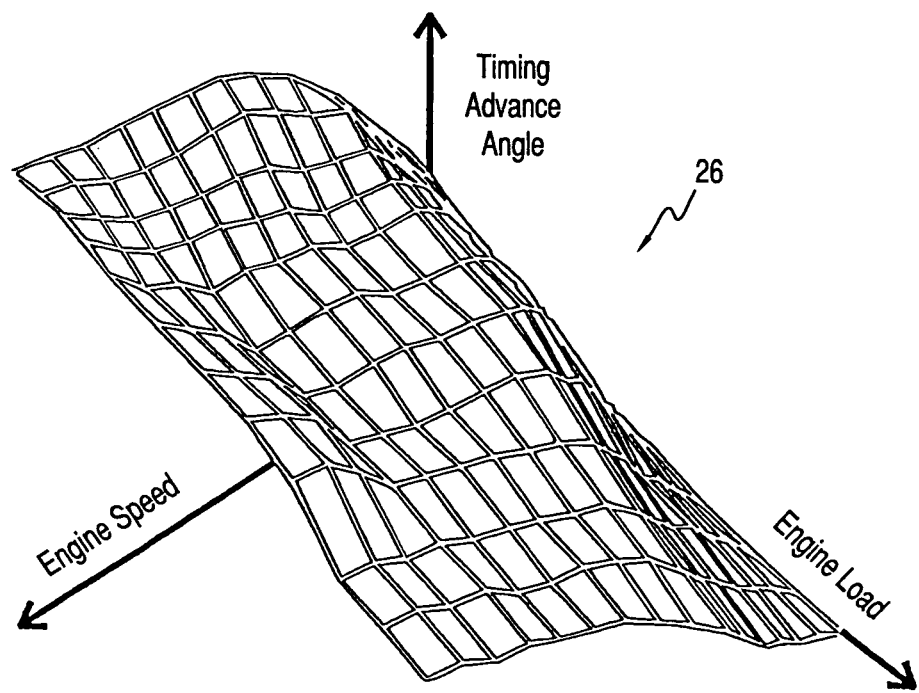
FIG. 2B is an example of a 3-dimensional ignition timing angle lookup table.

An engine-control program makes extensive use of lookup tables (sometimes called "characteristic maps"), such as a 2-dimensional specified engine load (SEL) lookup table 22 for stock engine control program and a SEL lookup table 24 for a chipped engine control program, as shown in FIG. 2A, or a 3-dimensional ignition timing angle lookup table 26, as shown in FIG. 2B. In the ignition timing angle lookup table 26, the engine speed input is derived from a cam position sensor and the engine load is derived from the engine speed and mass air flow sensors. The output of the lookup table 26 receives additional correction due to knock sensor readings, intake air temperature, desired air-fuel ratio, all of which are based on yet more lookup tables.

There are typically hundreds of lookup tables in each control program. Additionally, there can be more than a thousand single value constants. Together with the control algorithms themselves which are evaluated by the microprocessor's code execution, the entire behavior of the engine is controlled by what has been programmed into the flash memory 10.

The port 20 is the means for the ECU to communicate with the outside world for testing and diagnostic purposes. The port adheres to the minimum functionality, connector, and communications protocols of the OBD-II standard. The port 20 is also used by the ECU manufacturer for additional non-OBD-II functions, such as ECU reprogramming or more extensive data logging capabilities.

A conventional chipped ECU allows the user of choosing either the factory stock engine control program or a tuner's performance program. International Application Publication No. WO 02/14981 is an example of this system.

The present invention allows a user to choose an arbitrary combination of two different performance programs. For example, the user may want to have a performance gain that is only 75% of the full power of the chipped program because the user may be worried about an adverse impact on engine life at the full power program. To accomplish this, the present invention provides a configuration device, such as a laptop computer connected to the ECU diagnostic port 20, or dedicated serial port switch (see FIG. 9), to change the power level to 75%.

Figure 3:
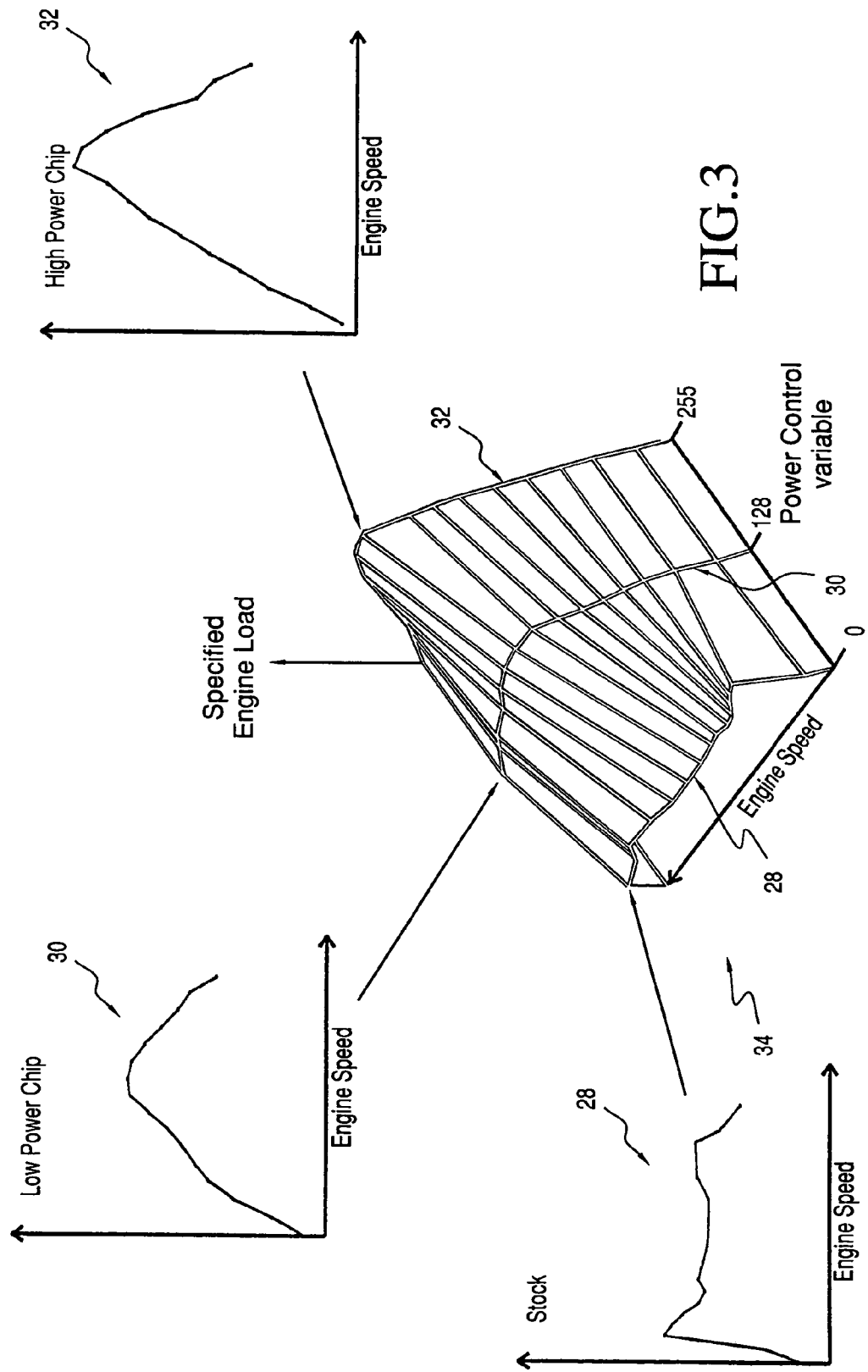
FIG. 3 is schematic diagram of how 2-dimensional lookup tables are combined to form a 3-dimensional lookup table.

Referring to FIG. 3, an example of how three different lookup tables can be blended together into one containing data from all three tables is shown. A stock SEL lookup 28, a chipped low power SEL lookup table 30 and a chipped high power lookup table 32 are shown.

In a normal ECU, one would have to select one of the several 2-dimensional SEL lookup tables. In the present invention, the engine control program's SEL lookup table is replaced with a single 3-dimensional lookup table 34 that contains data from all the 2-dimensional lookup tables 28, 30 and 32. The original engine control program already has several subroutines calls that handle 3-dimensional lookups. The engine control program is modified to change a table location pointer to point to the new 3-dimensional lookup table and change the sub-routine call address from a 2-dimensional lookup routine to a 3-dimensional lookup routine.

A power control variable (PCV), which has been arbitrarily named, is provided in the 3-dimensional lookup table to allow the user to choose an arbitrary combination of two different performance programs, such lookup tables 28 and 30, or lookup tables 30 and 32. A byte is used to store the settings, so that a range of possible values from 0 to 255 is available, thereby providing greater resolution. The maximum setting of 255 represents 100%, and 128 is roughly 50% of the maximum. The variable is located in a formerly unused location in the ECU RAM 16. If the variable is set to zero, the ECU runs the stock SEL lookup table 28. If the variable is set at 128, the chipped low power SEL lookup table 30 is used. Finally, if the variable is set to 255, the chipped high power SEL lookup 32 is used. If the variable is set to some other value between 0-128 or 128-255, linear interpolation is used to find an intermediate SEL value that lies between the two lookup tables. For example, a variable setting of 64 will give SEL value that sits halfway between the stock SEL lookup table 28 and the chipped low power lookup table 30.

An example of how linear interpolation is used to calculate intermediate values between two 2-dimensional lookup tables is discussed below.

Suppose the 2-D lookup tables have the values shown in the following table ate 1000 and 2000 RPM:

| Engine Speed (RPM) | 2-D Table #1 (PCV = 0) | 2-D Table #2 (PCV = 128) | 2-D Table #3 (PCV = 255) |
|---|---|---|---|
| 1000 | 400 | 550 | 650 |
| 2000 | 500 | 600 | 700 |

Assume the engine speed is 1000 RPM, and the PCV is set to 170. The ECU first figures out the PCV of 170 lies between the second and third columns. So it does what amounts to a 2-D lookup on the second column (output=550) and the third column (output=650). Then the ECU determines how far between the second and third columns we are (170–128 or 42 units); and the total width between the second and third columns (255–128 or 127 units). The ECU now assumes that the desired output value lies 42/127 of the way along a straight line connecting the points in the second and third columns (linear interpolation). So the final lookup result is: 650*(42/127)+550*(1-42/127) or about 583.

For a more complex example, assume a PCV value of 64 at an engine speed of 1500 RPM. The ECU figures out that it should work with the first and second columns. But this time it cannot simply take a pair points out of the table for the initial 2-D lookups since there is no range that corresponds to the 1500 RPM. Instead it uses linear interpolation between 1000 and 2000 RPM points to get an output value of 450 for the first column, and 575 for the second column. Then it proceeds as above to get to a final output value of about 513.

Figure 9:
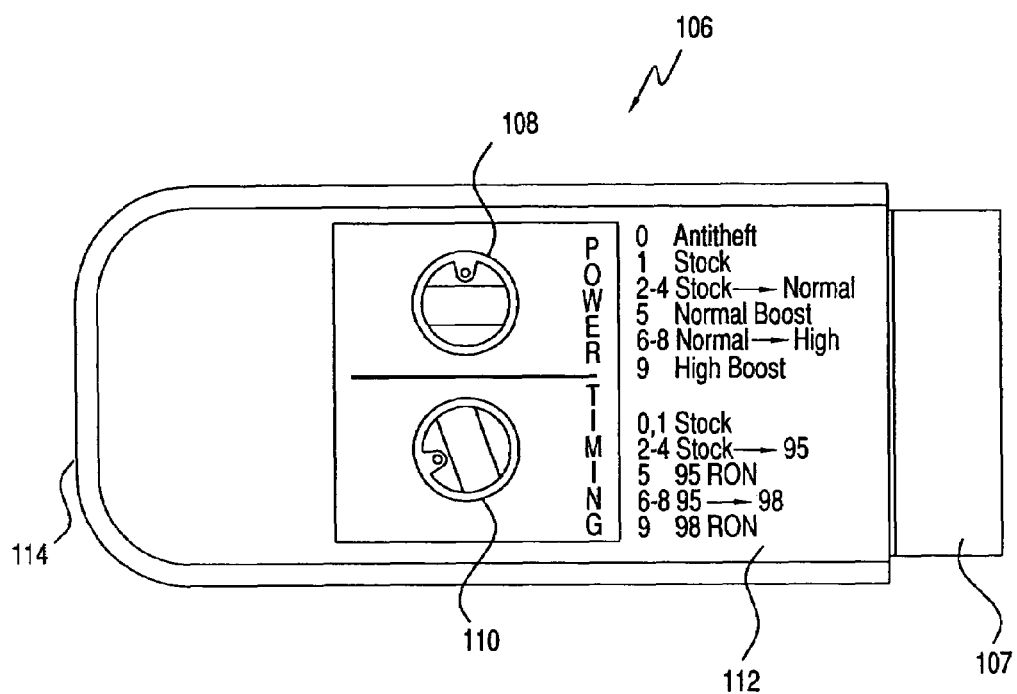
FIG. 9 is a schematic front face view of an external device used to select operating modes of a chipped ECU.

The power control variable is set by an external device that communicates with the ECU port 20 (see FIG. 9). Preferably, the power control variable is stored in an unused EEPROM location and is transferred to RAM for the 3-dimensional lookup. The external device directly writes the desired PCV setting to the ECU's EEPROM at the appropriate memory location. The setting may also be written into appropriate RAM location using the appropriate ECU manufacturer's commands; however, this approach has a disadvantage that the settings can become lost when the ECU power is lost.

To move smoothly between different 3-dimensional tables, linear interpolation is performed between the two 3-dimensional table lookups. Referring to FIG. 4A, prior to the present invention, the user has a choice of either running the factory stock 3-dimensional ignition lookup or a chipped 3-dimensional ignition advance lookup table. In the present invention, the user can have a range of choices between a stock 3-dimensional advance lookup table and a chipped 3-dimensional ignition advanced lookup table. Linear interpolation is performed between the two 3-dimensional tables, as shown in FIG. 4B. The timing control variable, which ranges from 0.0 for stock mode to 1.0 for chipped mode is selected by the user in the same way as the power control variable is done and is stored the same way. The timing control variable is also a byte with a range of values ranging from 0 to 255, but has been re-scaled for ease of explanation, with 255 corresponding to 1.0.

Although the examples given above are specific to SEL lookup tables and ignition timing angle lookup tables, the process is not limited to those lookup tables. Other lookup tables can use the above process where blending between two or more tables is desired.

Figure 5:
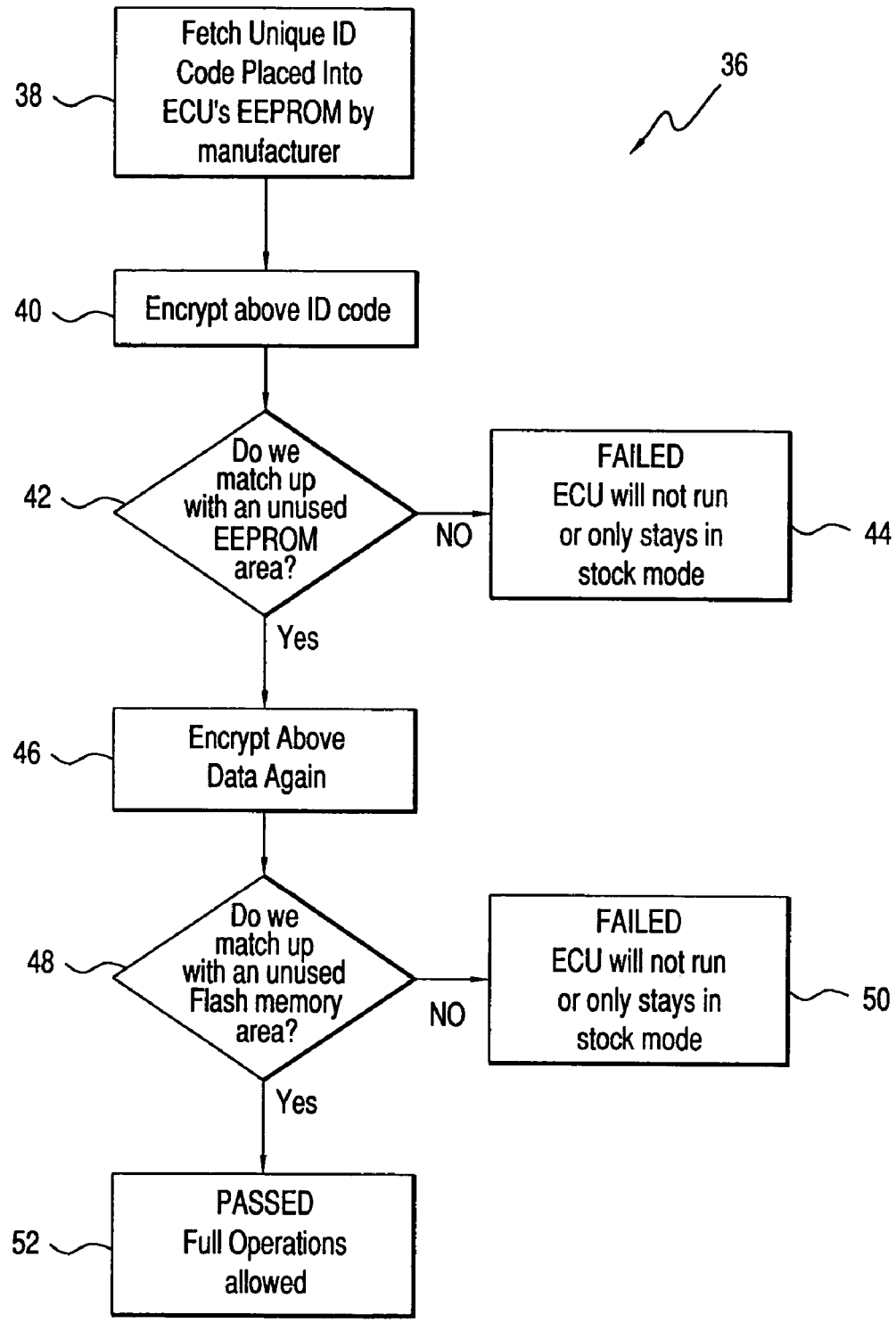
FIG. 5 is a flowchart of security routine to protect a chipped program from being copied from an ECU and have it run in another ECU without permission.
Figure 7:
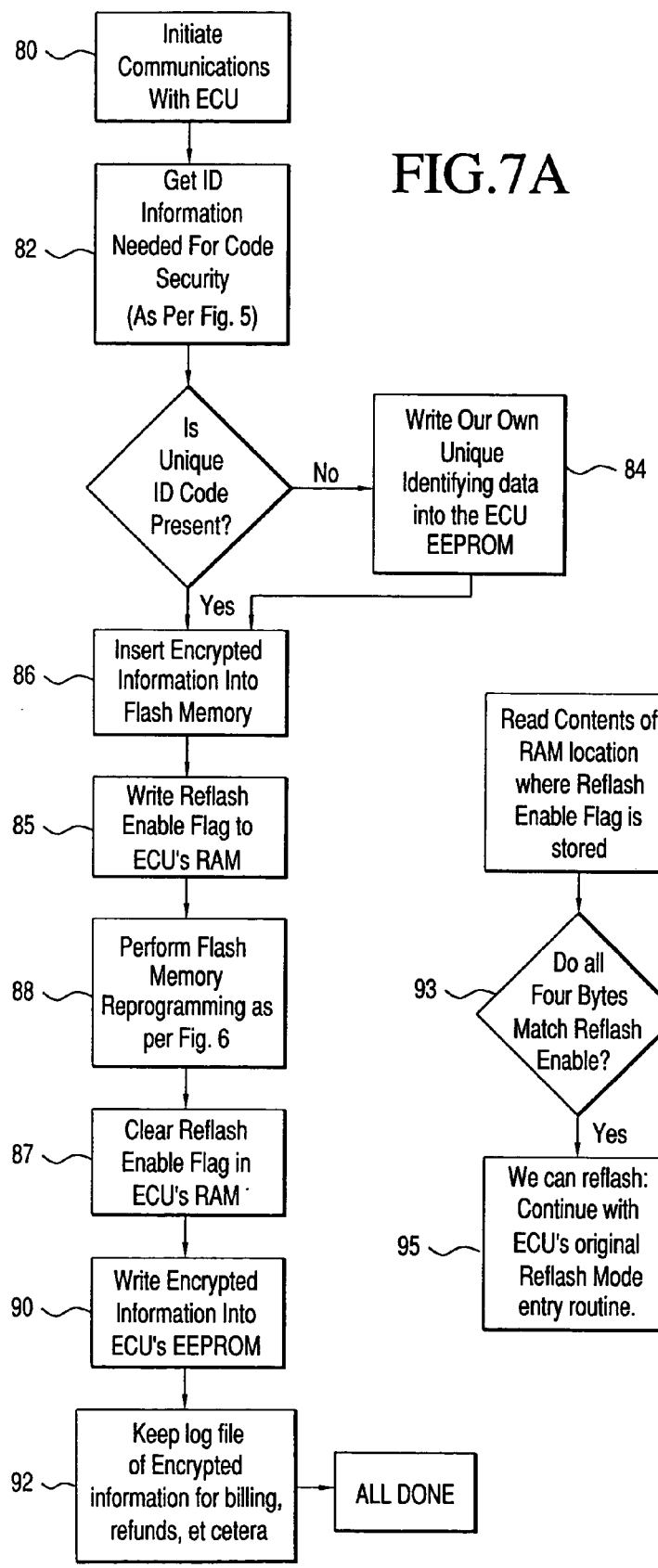
FIG. 7A is a flowchart of an ECU reprogramming process that incorporates routines to protect the chipped program from unauthorized copying and to prevent the chipped program from being inadvertently overwritten.
FIG. 7B is a flowchart of a modification to the ECU's original reflash mode entry routine for the reflash enable function.

When the ECU has been reprogrammed, for example, for increased engine torque and power output, it makes good sense to protect the new engine management software from being copied by others without permission. Without any security measures, it would be easy to read the software code from the ECU and copy into another ECU. In accordance with the present invention, the new control program is configured so that it can run only in one particular ECU in which it was originally written. Referring to FIG. 5, as part of the reprogramming process (see FIG. 7), the ECU is first interrogated to obtain some unique identifying information which is encrypted and placed into the new control program as it is being burned into the ECU. The encrypted information is then checked by a code security routine 36 to determine whether the ECU should operate in the chipped mode or the stock mode.

Referring to FIG. 5, the code security routine 36 reads some uniquely identifying information out of the ECU's EEPROM memory. In the preferred embodiment, an immobilizer ID code is read at 38. This ID code is preferred because it has the additional property that it cannot be changed, since the ID is transmitted and cross-checked with other control modules and any mismatch will prevent the car from starting. The ID code is then encrypted at 40 and compared to information stored in another location of the EEPROM memory at 42. The EEPROM location is unused by the original control program and therefore is available for use in the reprogramming. If the match fails, the ECU will not run or only stay in the stock mode at 44. If there is a match, the encrypted ID code is again encrypted at 46 and compared at 48 to an unused flash memory area where the encrypted information was previously stored in the reprogramming process. If the match fails, the ECU will not run or only stays in the stock mode at 50. If there is a match, then the ECU for the new control is allowed full operation at 52.

Figure 6:
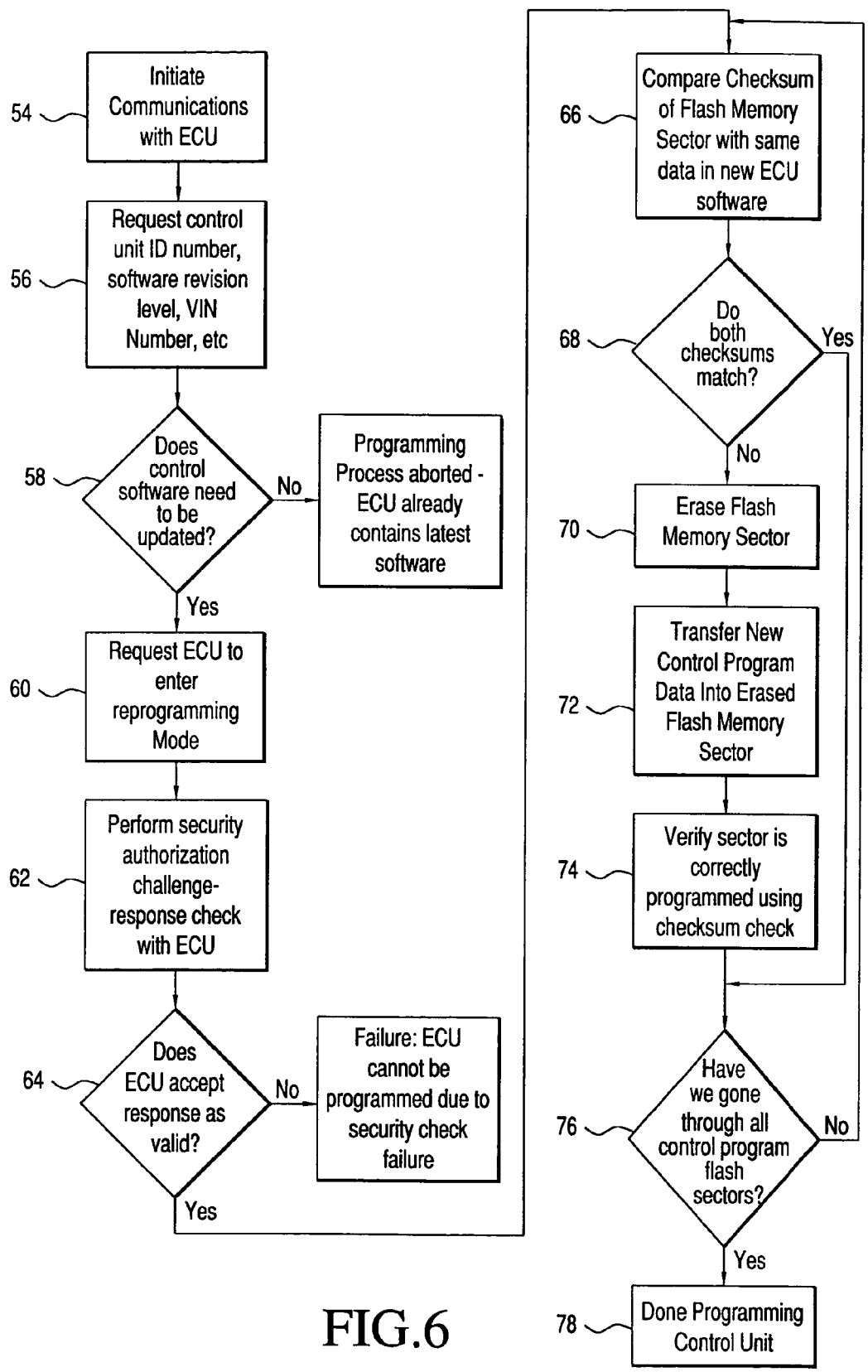
FIG. 6 is a flowchart of an ECU conventional reprogramming process.

Referring to FIG. 6, a normal reprogramming process for the ECU is disclosed. The reprogramming device, such as a laptop, dedicated hardware device (see FIG. 9), etc., connects to the ECU port 20 at 54 and requests various ID fields at 56 to determine if a code update is warranted at 58. The process continues at 60 only if new software needs to be placed in the ECU. A security mechanism at 62 prevents unauthorized ECU program changes. Each manufacturer has its own security mechanism. Once the check has passed at 64, one is allowed to go through each flash sector and reprogram it as needed. To save time, checksums of an existing ECU flash sector is compared with the same area in the control program at 66 and if the checksums match at 68, it indicates that the flash sectors are identical, and any reprogram process can be skipped for this sector. Otherwise, the flash memory sector is erased at 70 and the new control program data is transferred into the erased flash memory sector at 72. It is then verified that the sector is correctly programmed using the checksums check at 74. The process is repeated until all of the control program sectors have been updated. Programming is then completed at 78.

Reprogramming can also be accomplished by physically removing the flash memory chip from the ECU, reprogramming it and reinstalling it back to the ECU.

The reprogramming process depicted in FIG. 6 is modified to add the security routine 36 shown in FIG. 5 to prevent the modified control program to run in another ECU other than in the original ECU in which the chipped control program has been written.

Referring to FIG. 7A, the reprogramming device, such as a laptop or a dedicated hardware device (see FIG. 9), connects to the ECU port 20 at 80. A uniquely identifying information is read from the ECU's EEPROM memory at 82. Preferably, the ECU's immobilizer ID field is read. Some ECU types are used that do not have an immobilizer ID code, in which case those ECUs will have an empty field (every byte set to hex FF) in the EEPROM that is normally reserved for the immobilizer ID. An empty field in the EEPROM area were there is no immobilizer ID is easily recognized because a normal immobilizer ID cannot have every byte set to FF. If the immobilizer ID code is not present, a unique identifying data is written into the ECU EEPROM at 84. The ID code is encrypted and inserted into an unused flash memory area at 86. Reflash enable flag is written at 85 to the RAM 16. The flash memory is then reprogrammed at 88. The reflash enable flag in the RAM 16 is cleared at 87. The ID code is encrypted and written into an unused EEPROM area at 90. The ECU's uniquely identifying ID codes are recorded in a log file at 92. This is needed so that a user's ECU can be recognized in case the user wants to have the new software removed, new features added, etc. Also, the log file is used to verify that a user's ECU had been chipped, although it had been turned back to stock.

Referring to FIG. 7B, a routine 89 is used to modify the ECU's original reflash mode entry routine for the reflash enable function. This function works by terminating the routine that places the ECU into reflashing mode if reprogramming is not enabled, as indicated by the absence of the reflash enable flag. With this overwrite protection, it will prevent others from inadvertently overwriting the chipped program. The routine 89 checks for the presence of the reflash enable flag at 91 in a specific RAM location. If the flag is enabled at 93, then reprogramming proceeds normally at 95. If the flag is absent, then the reprogramming is not authorized at 97 and the actual reprogramming routines are rendered non-functional. To prevent accidental activation of the feature, a reflash enable flag that consists of a sequence of four specific bytes in the RAM is used. All four bytes must be correct or the reflashing is disabled.

The above described method for obtaining ID codes applies to Bosch Motronic 7 control units. Other ECU manufacturers may use different identifying codes and different methods for accessing them.

Another feature of the present invention is the ability for a user to evaluate a chipped control program that had been reprogrammed into the ECU. A timed evaluation period allows the user to experience the chipped program for a certain time period (e.g., 10 hours of engine run time) before the ECU switches back to the original stock performance level and stays there. If the user desires the chipped program permanently, the evaluation period is turned off. If the user does not want to keep the chipped program after the evaluation period, the control program automatically reverts back to the stock mode.

Figure 8:
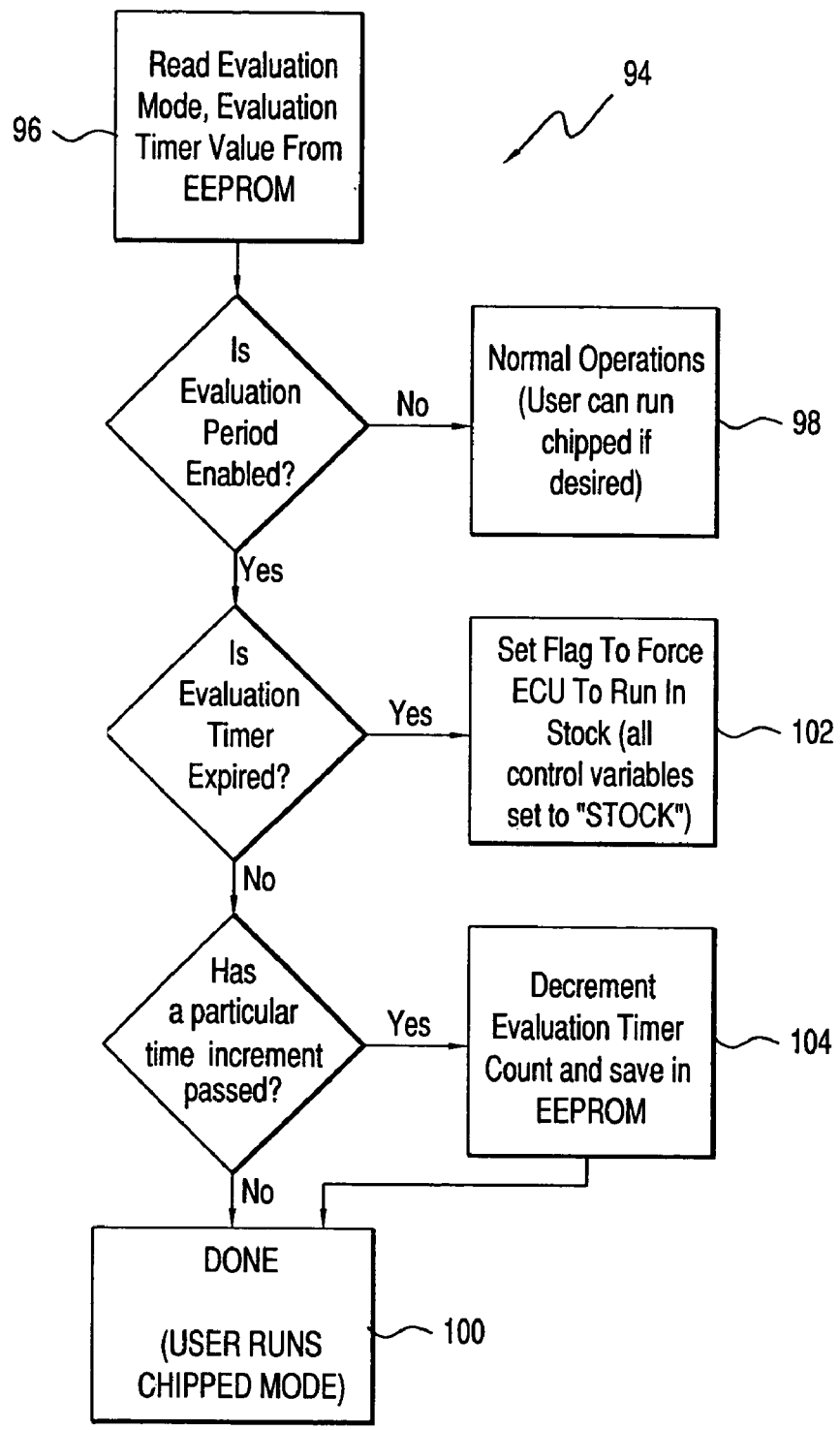
FIG. 8 is a flowchart of a chipped mode evaluation period routine.

Referring to FIG. 8, an evaluation routine 94 is disclosed. An evaluation period enable flag and an evaluation timer fields have been added to the EEPROM. When the ECU is turned on, the evaluation mode and evaluation timer value are read from the EEPROM at 96. If the evaluation period is not enabled, the ECU operates under normal operations at 98. If the evaluation period is enabled, and the evaluation timer has not yet expired, then the user can run at chipped mode at 100. If the evaluation period has expired, then the ECU is forced to run in stock mode at 102. If the evaluation timer has not expired, the timer count is decremented and saved in the EEPROM at 104 and the ECU is allowed to run in chipped mode.

The evaluation feature gives the user a certain time period during which he will be able evaluate the benefits of having a chipped ECU and if he likes the program, the evaluation period is permanently turned off by the dealer. If the user does not like a chipped ECU, the ECU automatically reverts back to stock performance levels at the end of the evaluation period.

Referring to FIG. 9, a dedicated hardware device 106 for interfacing with the chipped program in the ECU is disclosed. The hardware device 106 connects to the ECU port 20 at 107 and enables the user to input variables required by the chipped program, for example, power control variables and timing control variables, to allow the chipped ECU to operate at different modes other than at stock mode. The device 106 can also be used to enable or disable an anti-theft mode. Switches 108 and 110 allow the user to select the desired settings, for example, power and timing settings. Labels 112 are provided to guide the user in making the appropriate switch selections. The device 106 may have a cable interface 114 for connection to a laptop computer for more advanced functions, data logging, etc.

Figure 10:
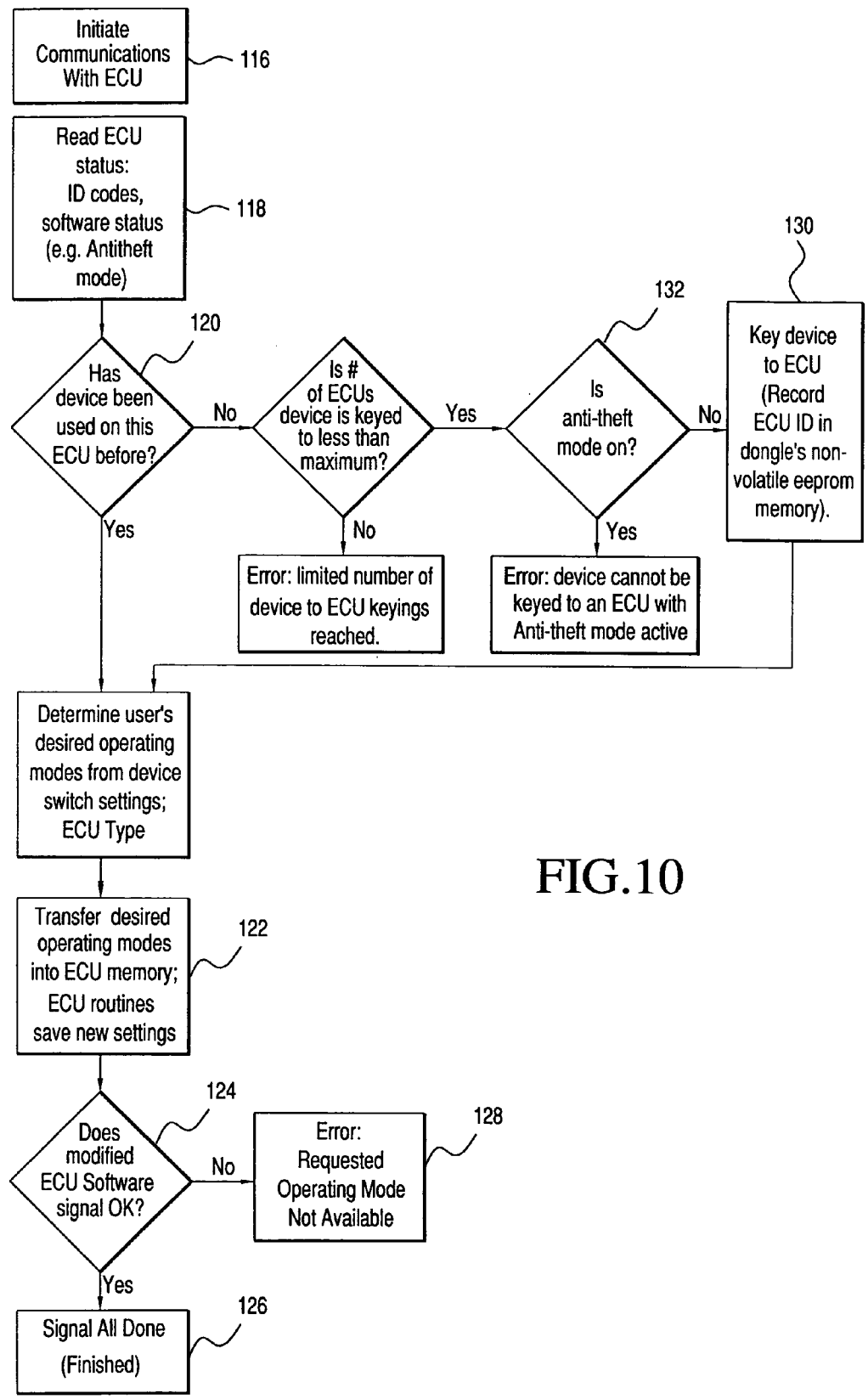
FIG. 10 is a flowchart of the execution process of external device of FIG. 9.

Referring to FIG. 10, communication by the device 106 with the ECU is initiated at 116. The ECU ID codes and the chipped software status (e.g., anti-theft mode) are read at 118. If the device 106 recognizes the ECU at 120, then the settings of the switches 108 and 110 are transferred into the ECU memory at 122. When the settings are accepted at 124, then the process is completed at 126. If the settings are not accepted, then an error signal is generated at 128. An audio buzzer built into the device provides feedback to the user for successful completion of the operation.

When the device encounters a new ECU at 120, the device will store the unique identifying information to key itself to the particular ECU at 130. However, if the anti-theft mode is turned on at 132, the device 106 will not be able to be keyed to the ECU. A single device 106 can work with several ECUs. However, a limited number of device to ECU keyings is programmed into the device so that only a certain number of ECUs can be keyed to the device.

The anti-theft mode is implemented in a Bosch ME7 ECU, which has a special EEPROM data byte that when set to a particular value does not allow the ECU to start. The data byte can be set and reset over the diagnostic port 20 through the device 106 and is thus used as a simple ECU disable/enable switch. Alternatively, the ECU's specified engine load may be forced to zero when the anti-theft mode is active to achieve the same result—the engine cannot start.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A method for providing a user a range of performance levels based on first and second performance lookup tables written into an engine control unit (ECU), comprising:
   a) providing first and second performance lookup tables in the ECU;
   b) assigning first and second constants corresponding to the first and second performance lookup tables, respectively;
   c) providing a range of variables disposed numerically between the first and second constants for selection by the user; and
   d) generating a third performance lookup table corresponding to the variable chosen by the user by linear interpolation between the first and second performance lookup tables.

2. A method as claim 1, wherein said first and second performance lookup tables are 2-dimensional lookup tables.

3. A method as in claim 2, wherein said first performance lookup table is a stock specified engine load (SEL) lookup table and said second performance lookup table is a chipped SEL lookup table.

4. A method as in claim 1, wherein said first performance lookup table is a stock 3-dimensional lookup table and said second performance lookup table is a chipped 3-dimensional lookup table.

5. A method as in claim 4, wherein said linear interpolation comprises:
   a) multiplying the stock 3-dimensional lookup table by (1-variable);
   b) multiplying the chipped 3-dimensional lookup table by the variable; and
   c) adding the results of a) and b), where the variable is 0.0 for the stock 3-dimensional lookup table to 1.0 for the chipped 3-dimensional lookup table.

6. A method as in claim 4, wherein said stock and chipped 3-dimensional lookup tables are ignition advance lookup tables.

7. A method as in claim 1, wherein the variable is selected through an external device connected to a communications port of the ECU.

8. A method as in claim 7, wherein the variable is transferred to the ECU EEPROM.

9. A method as in claim 7, and further comprising providing feedback to the user that the variable has been accepted by the ECU.

10. A method as in claim 7, and further comprising the step of keying the device to the ECU.

11. A method as in claim 10, wherein said keying includes recording an ID number from the ECU into memory in the device.

12. A method for reprogramming an engine control unit (ECU) having a stock performance lookup table, comprising:
   a) establishing communication with a communications port of said ECU;
   b) reprogramming the ECU with a chipped performance lookup table through the communication port; and
   c) said reprogramming includes allowing a user to choose at least the stock performance lookup table or the chipped performance lookup table or another performance lookup table generated by linear interpolation between said stock and chipped performance lookup tables, such that the user can select to operate the ECU at least at the stock performance lookup table or the chipped performance lookup table, or in between the stock and chipped performance lookup tables.

13. A method as in claim 12, wherein said allowing is implemented by an external device connected to the communication port; and said external device includes a switch to select to operate said ECU at least at said stock performance lookup table or said chipped performance lookup table, or in between said stock and chipped performance lookup tables.

14. A method as in claim 13, wherein said external device includes an audible signal to inform the user that the selection has been accepted by said ECU.

15. A method as in claim 12, wherein said reprogramming includes allowing the user to run the ECU at least at the chipped performance lookup table, or in between the stock and chipped performance lookup tables for a predetermined period of time.

16. A method as in claim 15, wherein said reprogramming includes reverting the ECU to the stock performance stock table when the predetermined period of time runs out.

17. A method for preventing a control program written in a first engine control unit (ECU) from running in a second ECU, comprising:
   a) obtaining an ID number from the first ECU;
   b) writing the ID number into a first memory location of the first ECU;
   c) requiring the control program to match the ID number placed in the first memory location before running the program, and if the match fails, terminating the control program from running further.

18. A method as in claim 17, wherein the ID number is obtained from the first ECU EEPROM.

19. A method as in claim 18, wherein the ID number is a manufacturer's immobilizer code.

20. A method as in claim 17, wherein said obtaining the ID number comprises generating an ID number.

21. A method as in claim 17, wherein:
   a) the first ECU includes an original control program; and
   b) the first memory location is a flash memory area unused by the original control program.

22. A method as in claim 17, wherein the ID number is encrypted before being written into the first memory location.

23. A method as in claim 17, and further comprising:
   a) writing the ID number into a second memory location of the first ECU; and
   b) requiring the control program to match the ID number placed in the second memory location before running the program, and if the match fails, termination the control program from running further.

24. A method as in claim 23, wherein the second memory location is an EEPROM area unused by the original control program.

25. A method as in claim 23, wherein the ID number is encrypted before being written into the second memory location.

26. A method as in claim 25, wherein the ID number is encrypted before being written into the first memory location.

27. A method as in claim 26, wherein said requiring step comprises:
   a) obtaining the ID number from the ECU in which the control program is written;
   b) encrypting the ID number; and
   c) matching the encrypted ID number with data in the first memory location, and if the match fails, the control program is not allowed to run further.

* * * * *